United States Patent
Stager et al.

(10) Patent No.: US 7,325,159 B2
(45) Date of Patent: Jan. 29, 2008

(54) METHOD AND SYSTEM FOR DATA RECOVERY IN A CONTINUOUS DATA PROTECTION SYSTEM

(75) Inventors: Roger Keith Stager, Livermore, CA (US); Donald Alvin Trimmer, Livermore, CA (US); Pawan Saxena, Pleasanton, CA (US); Randall Johnson, Pleasant Grove, UT (US); Craig Anthony Johnston, Livermore, CA (US); Yafen Peggy Chang, Fremont, CA (US); Rico Blaser, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 380 days.

(21) Appl. No.: 10/772,017

(22) Filed: Feb. 4, 2004

(65) Prior Publication Data

US 2005/0188256 A1   Aug. 25, 2005

Related U.S. Application Data

(60) Provisional application No. 60/541,626, filed on Feb. 4, 2004.

(51) Int. Cl.
*G06F 11/00* (2006.01)
(52) U.S. Cl. ............................. 714/13; 714/2
(58) Field of Classification Search .................... 714/2, 714/13, 11, 12, 5, 8; 707/202
See application file for complete search history.

(56) References Cited

U.S. PATENT DOCUMENTS

| 4,635,145 A | 1/1987 | Horie et al. |
|---|---|---|
| 4,727,512 A | 2/1988 | Birkner et al. |
| 4,775,969 A | 10/1988 | Osterlund |
| 5,235,695 A | 8/1993 | Pence |
| 5,297,124 A | 3/1994 | Plotkin et al. |
| 5,438,674 A | 8/1995 | Keele et al. |
| 5,455,926 A | 10/1995 | Keele et al. |

(Continued)

FOREIGN PATENT DOCUMENTS

| EP | 1333379 | 4/2006 |
|---|---|---|
| EP | 1 671 231 | 6/2006 |
| EP | 1 671231 | 6/2006 |

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—Dieu-Minh Le
(74) *Attorney, Agent, or Firm*—Volpe and Koenig, P.C.

(57) ABSTRACT

In a continuous data protection system having a primary volume and a secondary volume, a method for data recovery begins by selecting a snapshot of the primary volume to be recovered and a location on which the snapshot is to be loaded. A point in time (PIT) map is created for the selected snapshot, and the selected snapshot is loaded at the selected location. A data block from the PIT map is resolved to determine which block on the secondary volume is presented as being part of the snapshot. The snapshot is accessed via a host computer as if the snapshot was the primary volume at an earlier point in time, corresponding to the time of the selected snapshot.

20 Claims, 3 Drawing Sheets

U.S. PATENT DOCUMENTS

| | | | |
|---|---|---|---|
| 5,485,321 A | 1/1996 | Leonhardt et al. | |
| 5,666,538 A | 9/1997 | DeNicola | |
| 5,673,382 A * | 9/1997 | Cannon et al. | 714/6 |
| 5,774,292 A | 6/1998 | Georgiou et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,854,720 A | 12/1998 | Shrinkle et al. | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,163,856 A | 12/2000 | Dion et al. | |
| 6,163,858 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 * | 7/2001 | Hsiao et al. | 714/6 |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 * | 2/2004 | Leach et al. | 714/6 |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,915,397 B2 | 7/2005 | Lubbers et al. | |
| 6,931,557 B2 | 8/2005 | Togawa | |
| 6,950,263 B2 | 9/2005 | Suzuki et al. | |
| 6,973,534 B2 | 12/2005 | Dawson | |
| 6,978,325 B2 | 12/2005 | Gibble | |
| 7,032,126 B2 * | 4/2006 | Zalewski et al. | 714/7 |
| 7,055,009 B2 | 5/2006 | Factor et al. | |
| 7,096,331 B1 | 8/2006 | Haase et al. | |
| 7,100,089 B1 | 8/2006 | Phelps | |
| 7,111,136 B2 | 9/2006 | Yamagami | |
| 7,127,388 B2 | 10/2006 | Yates et al. | |
| 7,155,586 B1 * | 12/2006 | Wagner et al. | 711/162 |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0095557 A1 | 7/2002 | Constable et al. | |
| 2002/0144057 A1 | 10/2002 | Li et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0037211 A1 | 2/2003 | Winokur | |
| 2003/0120676 A1 | 6/2003 | Holavanahalli et al. | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0182350 A1 | 9/2003 | Dewey | |
| 2003/0188208 A1 | 10/2003 | Fung | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0181388 A1 | 9/2004 | Yip et al. | |
| 2004/0181707 A1 * | 9/2004 | Fujibayashi | 714/6 |
| 2005/0010529 A1 * | 1/2005 | Zalewski et al. | 705/54 |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076264 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Passerini | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |

FOREIGN PATENT DOCUMENTS

| | | |
|---|---|---|
| WO | WO1999/03098 | 1/1999 |
| WO | WO1999/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato Networker Data Protection Solution" Alacritus Software, Inc., Jan. 8, 2002.
Camphuisen, Alicia, "Hitachi Inks OEM Deal with Legato" Knapp Comm., Jul. 17, 2002.
"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Security, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Korniega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Software's Securitus I: Pointing the Way to Virtual Tape Libraries" Aberdeen Group, Inc., Mar. 2002.
"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc. Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard - A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alactritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.

Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Managability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Announces Disk-Based Successor to Tape" Knapp Comm., Aug. 21, 2002.

* cited by examiner

METHOD AND SYSTEM FOR DATA RECOVERY IN A CONTINUOUS DATA PROTECTION SYSTEM

CROSS REFERENCE TO RELATED APPLICATION(S)

This application claims priority from U.S. Provisional Application No. 60/541,626, entitled "METHOD AND SYSTEM FOR CONTINUOUS DATA PROTECTION," filed on Feb. 4, 2004, which is incorporated by reference as if fully set forth herein.

FIELD OF INVENTION

The present invention relates generally to continuous data protection, and more particularly, to data recovery in a continuous data protection system.

BACKGROUND

Hardware redundancy schemes have traditionally been used in enterprise environments to protect against component failures. Redundant arrays of independent disks (RAID) have been implemented successfully to assure continued access to data even in the event of one or more media failures (depending on the RAID Level). Unfortunately, hardware redundancy schemes are ineffective in dealing with logical data loss or corruption. For example, an accidental file deletion or virus infection is automatically replicated to all of the redundant hardware components and can neither be prevented nor recovered from by such technologies. To overcome this problem, backup technologies have traditionally been deployed to retain multiple versions of a production system over time. This allowed administrators to restore previous versions of data and to recover from data corruption.

Backup copies are generally policy-based, are tied to a periodic schedule, and reflect the state of a primary volume (i.e., a protected volume) at the particular point in time that is captured. Because backups are not made on a continuous basis, there will be some data loss during the restoration, resulting from a gap between the time when the backup was performed and the restore point that is required. This gap can be significant in typical environments where backups are only performed once per day. In a mission-critical setting, such a data loss can be catastrophic. Beyond the potential data loss, restoring a primary volume from a backup system can be complicated and often takes many hours to complete. This additional downtime further exacerbates the problems associated with a logical data loss.

The traditional process of backing up data to tape media is time driven and time dependent. That is, a backup process typically is run at regular intervals and covers a certain period of time. For example, a full system backup may be run once a week on a weekend, and incremental backups may be run every weekday during an overnight backup window that starts after the close of business and ends before the next business day. These individual backups are then saved for a predetermined period of time, according to a retention policy. In order to conserve tape media and storage space, older backups are gradually faded out and replaced by newer backups. Further to the above example, after a full weekly backup is completed, the daily incremental backups for the preceding week may be discarded, and each weekly backup may be maintained for a few months, to be replaced by monthly backups. The daily backups are typically not all discarded on the same day. Instead, the Monday backup set is overwritten on Monday, the Tuesday backup set is overwritten on Tuesday, and so on. This ensures that a backup set is available that is within eight business hours of any corruption that may have occurred in the past week.

Despite frequent hardware failures and the necessity of ongoing maintenance and tuning, the backup creation process can be automated, while restoring data from a backup remains a manual and time-critical process. First, the appropriate backup tapes need to be located, including the latest full backup and any incremental backups made since the last full backup. In the event that only a partial restoration is required, locating the appropriate backup tape can take just as long. Once the backup tapes are located, they must be restored to the primary volume. Even under the best of circumstances, this type of backup and restore process cannot guarantee high availability of data.

Another type of data protection involves making point in time (PIT) copies of data. A first type of PIT copy is a hardware-based PIT copy, which is a mirror of the primary volume onto a secondary volume. The main drawbacks to a hardware-based PIT copy are that the data ages quickly and that each copy takes up as much disk space as the primary volume. A software-based PIT, typically called a "snapshot," is a "picture" of a volume at the block level or a file system at the operating system level. Various types of software-based PITs exist, and most are tied to a particular platform, operating system, or file system. These snapshots also have drawbacks, including occupying additional space on the primary volume, rapid aging, and possible dependencies on data stored on the primary volume wherein data corruption on the primary volume leads to corruption of the snapshot. In addition, snapshot systems generally do not offer the flexibility in scheduling and expiring snapshots that backup software provides.

While both hardware-based and software-based PIT techniques reduce the dependency on the backup window, they still require the traditional tape-based backup and restore process to move data from disk to tape media and to manage the different versions of data. This dependency on legacy backup applications and processes is a significant drawback of these technologies. Furthermore, like traditional tape-based backup and restore processes, PIT copies are made at discrete moments in time, thereby limiting any restores that are performed to the points in time at which PIT copies have been made.

A need therefore exists for a system that combines the advantages of tape-based systems with the advantages of snapshot systems and eliminates the limitations described above.

SUMMARY

In a continuous data protection system having a primary volume and a secondary volume, a method for data recovery begins by selecting a snapshot of the primary volume to be recovered and a location on which the snapshot is to be loaded. A point in time (PIT) map is created for the selected snapshot, and the selected snapshot is loaded at the selected location. A data block from the PIT map is resolved to determine which block on the secondary volume is presented as being part of the snapshot. The snapshot is accessed via a host computer as if the snapshot was the primary volume at an earlier point in time, corresponding to the time of the selected snapshot.

A system for data recovery in a continuous data protection system includes a host computer, a primary data volume, and a secondary data volume. Creating means are used to create a snapshot of the primary data volume and storing means are used to store the snapshot on the secondary data volume. Selecting means are provided for selecting a snapshot on the secondary data volume. Accessing means are used to access the selected snapshot on the host computer, wherein the selected snapshot is presented to a user as if the selected snapshot were the primary data volume at an earlier point in time, corresponding to the time of the selected snapshot.

BRIEF DESCRIPTION OF THE DRAWING(S)

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENT(S)

In the present invention, data is backed up continuously, allowing system administrators to pause, rewind, and replay live enterprise data streams. This moves the traditional backup methodologies into a continuous background process in which policies automatically manage the lifecycle of many generations of restore images.

System Construction

Figure 1A:
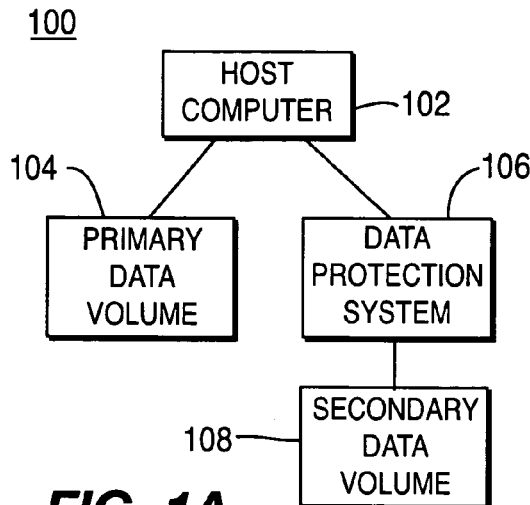
FIGS. 1A-1C are block diagrams showing a continuous data protection environment in accordance with the present invention.

FIG. 1A shows a preferred embodiment of a protected computer system 100 constructed in accordance with the present invention. A host computer 102 is connected directly to a primary data volume 104 (the primary data volume may also be referred to as the protected volume) and to a data protection system 106. The data protection system 106 manages a secondary data volume 108. The construction of the system 100 minimizes the lag time by writing directly to the primary data volume 104 and permits the data protection system 106 to focus exclusively on managing the secondary data volume 108. The management of the volumes is preferably performed using a volume manager.

A volume manager is a software module that runs on a server or intelligent storage switch to manage storage resources. Typical volume managers have the ability to aggregate blocks from multiple different physical disks into one or more virtual volumes. Applications are not aware that they are actually writing to segments of many different disks because they are presented with one large, contiguous volume. In addition to block aggregation, volume managers usually also offer software RAID functionality. For example, they are able to split the segments of the different volumes into two groups, where one group is a mirror of the other group. This is, in a preferred embodiment, the feature that the data protection system is taking advantage of when the present invention is implemented as shown in FIG. 1A. In many environments, the volume manager or host-based driver already mirrors the writes to two distinct different primary volumes for redundancy in case of a hardware failure. The present invention is configured as a tertiary mirror target in this scenario, such that the volume manager or host-based driver also sends copies of all writes to the data protection system.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location, as will be explained in detail below. It is noted that there may also be differences in terms of the technologies that are used. The primary volume 104 is typically an expensive, fast, and highly available storage subsystem, whereas the secondary volume 108 is typically cost-effective, high capacity, and comparatively slow (for example, ATA/SATA disks). Normally, the slower secondary volume cannot be used as a synchronous mirror to the high-performance primary volume, because the slower response time will have an adverse impact on the overall system performance.

The data protection system 106, however, is optimized to keep up with high-performance primary volumes. These optimizations are described in more detail below, but at a high level, random writes to the primary volume 104 are processed sequentially on the secondary volume 108. Sequential writes improve both the cache behavior and the actual volume performance of the secondary volume 108. In addition, it is possible to aggregate multiple sequential writes on the secondary volume 108, whereas this is not possible with the random writes to the primary volume 104. The present invention does not require writes to the data protection system 106 to be synchronous. However, even in the case of an asynchronous mirror, minimizing latencies is important.

Figure 1B:
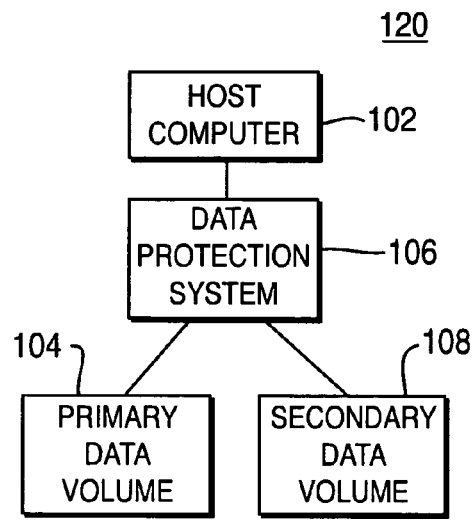

FIG. 1B shows an alternate embodiment of a protected computer system 120 constructed in accordance with the present invention. The host computer 102 is directly connected to the data protection system 106, which manages both the primary data volume 104 and the secondary data volume 108. The system 120 is likely slower than the system 100 described above, because the data protection system 106 must manage both the primary data volume 104 and the secondary data volume 108. This results in a higher latency for writes to the primary data volume 104 in the system 120 and lowers the available bandwidth for use. Additionally, the introduction of a new component into the primary data path is undesirable because of reliability concerns.

Figure 1C:
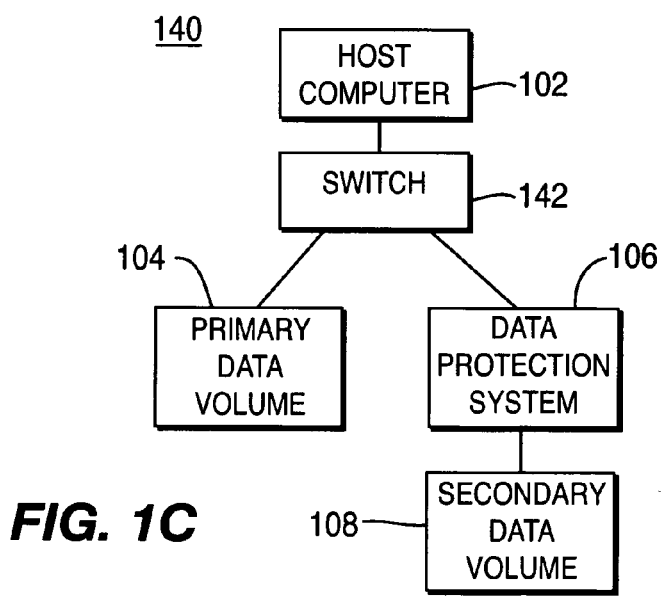

FIG. 1C shows another alternate embodiment of a protected computer system 140 constructed in accordance with the present invention. The host computer 102 is connected to an intelligent switch 142. The switch 142 is connected to the primary data volume 104 and the data protection system 106, which in turn manages the secondary data volume 108. The switch 142 includes the ability to host applications and contains some of the functionality of the data protection system 106 in hardware, to assist in reducing system latency and improve bandwidth.

It is noted that the data protection system 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

Conceptual Overview

To facilitate further discussion, it is necessary to explain some fundamental concepts associated with a continuous data protection system constructed in accordance with the present invention. In practice, certain applications require continuous data protection with a block-by-block granularity, for example, to rewind individual transactions. However, the period in which such fine granularity is required is generally short (for example, two days), which is why the system can be configured to fade out data over time. The present invention discloses data structures and methods to manage this process automatically.

The present invention keeps a log of every write made to a primary volume (a "write log") by duplicating each write and directing the copy to a cost-effective secondary volume in a sequential fashion. The resulting write log on the secondary volume can then be played back one write at a time to recover the state of the primary volume at any previous point in time. Replaying the write log one write at a time is very time consuming, particularly if a large amount of write activity has occurred since the creation of the write log. In typical recovery scenarios, it is necessary to examine how the primary volume looked like at multiple points in time before deciding which point to recover to. For example, consider a system that was infected by a virus. In order to recover from the virus, it is necessary to examine the primary volume as it was at different points in time to find the latest recovery point where the system was not yet infected by the virus. Additional data structures are needed to efficiently compare multiple potential recovery points.

Delta Maps

Delta maps provide a mechanism to efficiently recover the primary volume as it was at a particular point in time without the need to replay the write log in its entirety, one write at a time. In particular, delta maps are data structures that keep track of data changes between two points in time. These data structures can then be used to selectively play back portions of the write log such that the resulting point-in-time image is the same as if the log were played back one write at a time, starting at the beginning of the log.

Figure 2:
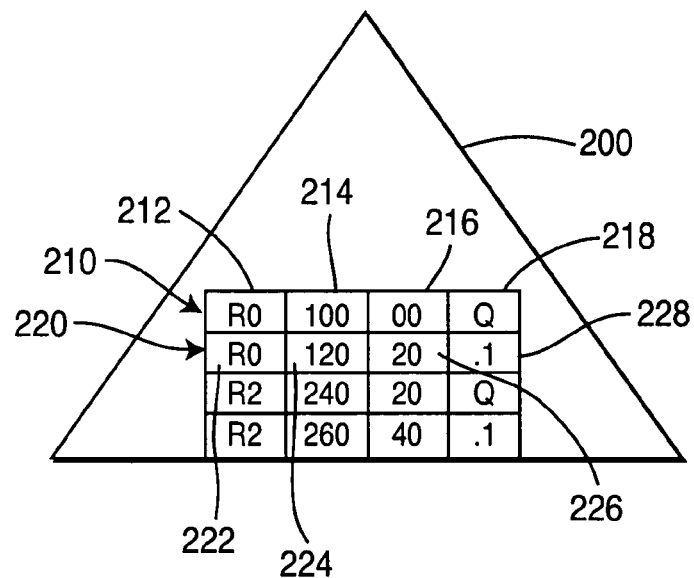
FIG. 2 is an example of a delta map in accordance with the present invention.

FIG. 2 shows a delta map 200 constructed in accordance with the present invention. While the format shown in FIG. 2 is preferred, any format containing similar information may be used. For each write to a primary volume, a duplicate write is made, in sequential order, to a secondary volume. To create a mapping between the two volumes, it is preferable to have an originating entry and a terminating entry for each write. The originating entry includes information regarding the origination of a write, while the terminating entry includes information regarding the termination of the write.

As shown in delta map 200, row 210 is an originating entry and row 220 is a terminating entry. Row 210 includes a field 212 for specifying the region of a primary volume where the first block was written, a field 214 for specifying the block offset in the region of the primary volume where the write begins, a field 216 for specifying where on the secondary volume the duplicate write (i.e., the copy of the primary volume write) begins, and a field 218 for specifying the physical device (the physical volume or disk identification) used to initiate the write. Row 220 includes a field 222 for specifying the region of the primary volume where the last block was written, a field 224 for specifying the block offset in the region of the primary volume where the write ends, a field 226 for specifying the where on the secondary volume the duplicate write ends, and a field 228. While fields 226 and 228 are provided in a terminating entry such as row 220, it is noted that field 226 is optional because this value can be calculated by subtracting the offsets of the originating entry and the terminating entry (field 226=(field 224−field 214)+field 216), and field 228 is not necessary since there is no physical device usage associated with termination of a write.

In a preferred embodiment, as explained above, each delta map contains a list of all blocks that were changed during the particular time period to which the delta map corresponds. That is, each delta map specifies a block region on the primary volume, the offset on the primary volume, and physical device information. It is noted, however, that other fields or a completely different mapping format may be used while still achieving the same functionality. For example, instead of dividing the primary volume into block regions, a bitmap could be kept, representing every block on the primary volume. Once the retention policy (which is set purely according to operator preference) no longer requires the restore granularity to include a certain time period, corresponding blocks are freed up, with the exception of any blocks that may still be necessary to restore to later recovery points. Once a particular delta map expires, its block list is returned to the appropriate block allocator for re-use.

Delta maps are initially created from the write log using a map engine, and can be created in real-time, after a certain number of writes, or according to a time interval. It is noted that these are examples of ways to trigger the creation of a delta map, and that one skilled in the art could devise various other triggers. Additional delta maps may also be created as a result of a merge process (called "merged delta maps") and may be created to optimize the access and restore process. The delta maps are stored on the secondary volume and contain a mapping of the primary address space to the secondary address space. The mapping is kept in sorted order based on the primary address space.

One significant benefit of merging delta maps is a reduction in the number of delta map entries that are required. For example, when there are two writes that are adjacent to each other on the primary volume, the terminating entry for the first write can be eliminated from the merged delta map, since its location is the same as the originating entry for the second write. The delta maps and the structures created by merging maps reduces the amount of overhead required in maintaining the mapping between the primary and secondary volumes.

Data Recovery

Data is stored in a block format, and delta maps can be merged to reconstruct the full primary volume as it looked like at a particular point in time. Users need to be able to access this new volume seamlessly from their current servers. There are two ways to accomplish this at a block level. The first way is to mount the new volume (representing the primary volume at a previous point in time) to the server. The problem with this approach is that it can be a relatively complex configuration task, especially since the operation needs to be performed under time pressure and during a crisis situation, i.e., during a system outage. However, some systems now support dynamic addition and removal of volumes, so this may not be a concern in some situations.

Figure 3:
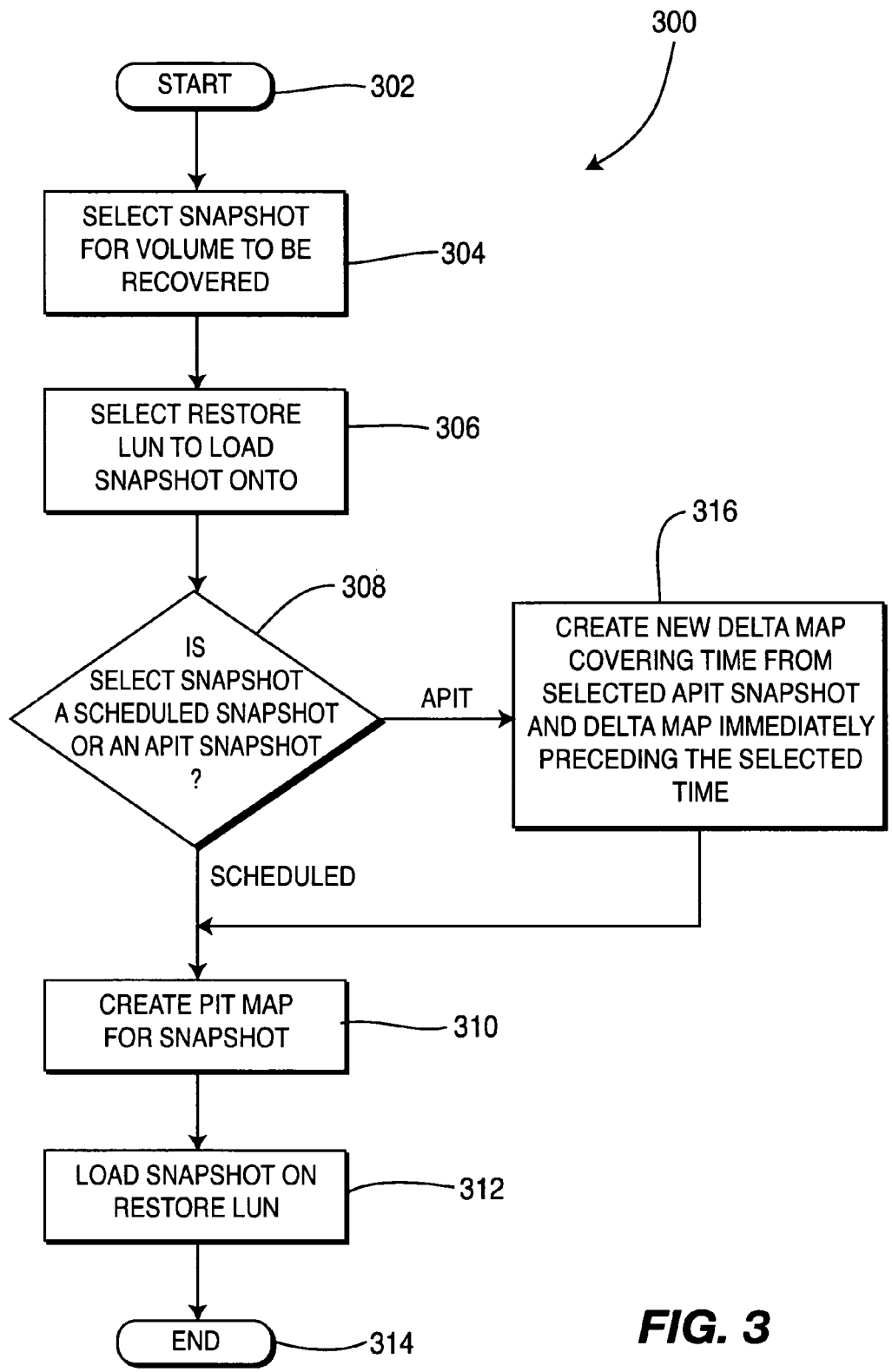
FIG. 3 is a flowchart showing a data recovery procedure in accordance with the present invention.

The second way to access the recovered primary volume is to treat the recovered volume as a piece of removable media (e.g., a CD), that is inserted into a shared removable media drive. In order to properly recover data from the primary volume at a previous point in time, an image of the primary volume is loaded onto a location on the network, each location having a separate identification known as a logical unit number (LUN). This image of the primary volume can be built by using a method 300 to recover data by accessing a previously stored snapshot, as shown in FIG. 3.

The method 300 begins (step 302) by selecting a snapshot for the primary volume to be recovered (step 304). Since there will be multiple snapshots available for each protected volume, the actual snapshot which is required for access needs to be selected. A list of available snapshots for a particular protected volume can be displayed from a graphical user interface (GUI) of the data protection system. The snapshot to be selected can be either a scheduled snapshot or an any point in time (APIT) snapshot.

Figure 4:
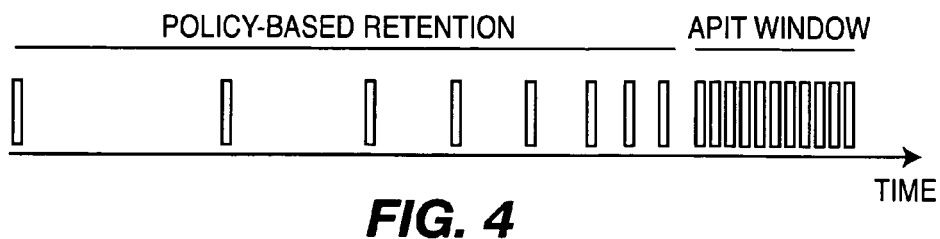
FIG. 4 is a diagram illustrating a retention policy for the fading out of snapshots in accordance with the present invention.

FIG. 4 shows a diagram of a retention policy used in connection with fading out the APIT snapshots over time. The retention policy consists of several parts. One part is used to decide how large the APIT window is and another part decides when to take scheduled snapshots and for how long to retain them. Each scheduled snapshot consists of all the changes up to that point in time; over longer periods of time, each scheduled snapshot will contain the changes covering a correspondingly larger period of time, with the granularity of more frequent snapshots being unnecessary.

The user can select any time that occurs within the APIT coverage. If the selected point in time occurs within a period in which the write log is out of sync (usually due to an earlier shutdown or error condition), then APIT snapshots for that period will not be available (the user will not be able to select a point in time for which the write log is out of sync). The list of times for which the write log is out of sync are determined by the data protection system and are saved with the primary volume.

Referring back to FIG. 3, a restore LUN is selected to load the snapshot onto (step 306). The restore LUN is the method for accessing a snapshot from the host. In this role, the restore LUN acts as a virtual removable media disk device (e.g., a CD drive) and the snapshot to be accessed acts as virtual piece of removable media (e.g., a CD). It is possible to restrict access to the restore LUN, permitting only authorized host computers to access the restore LUN. This type of access can be set via an access policy or other suitable access control mechanism.

Next, a determination is made whether the selected snapshot (from step 304) is a scheduled snapshot or an APIT snapshot (step 308). If the selected snapshot is a scheduled snapshot, then a point in time (PIT) map is created for the snapshot using a delta map manager (step 310). Regions of all the delta maps prior to the time of the selected snapshot are merged to create the PIT map region by region. In order to enhance performance and the speed of access to a snapshot, the snapshot data can be accessed while the PIT map is being constructed. The snapshot is "loaded" onto the selected restore LUN (step 312), and the method terminates (step 314).

If the selected snapshot is an APIT snapshot (step 308), then a new delta map is created covering the time between the time of the selected snapshot and the time of the delta map immediately preceding the time of the selected snapshot (step 316). This new delta map is created because there is not necessarily a delta map corresponding to the time of the selected APIT snapshot. Due to the nature of APIT coverage, it is simply not feasible to store delta maps for every point in time in the APIT window. The procedure then continues with step 310, as described above, with the new delta map being used in connection with the creation of the PIT map.

When an application or file system accesses a certain block on the restore LUN, the system uses the map to determine which block should be returned. If this particular block has not been resolved yet, the block is resolved immediately. Resolving a block refers to the map merging process. When a certain block has been "resolved," it means that through map merging it has been determined which block on the secondary volume should be presented to the host as part of the removable media. This creates the illusion to the user that the full volume has already been recreated. To avoid possible delays when accessing portions of the restore LUN, the user may request that the entire map be generated and loaded into memory. This will cause a longer delay before the first access, but creates a more predictable delay once the snapshot is mounted.

After the snapshot has been loaded onto the restore LUN, the user can access the snapshot as if it were the primary volume at the selected previous point in time. The snapshot is fully read/write accessible, and the user can perform a roll-forward of all the writes that occurred from the time of the snapshot. Changes made to the snapshot are not duplicated onto the primary volume, because the snapshot is, by definition, a reflection of the primary volume at a previous point in time. It is noted that while the user is accessing a snapshot, the primary volume is still being protected as under normal operating conditions. Furthermore, different snapshots can be loaded into different LUNs; the user is not restricted to accessing one snapshot at a time. Once the user is finished with the restore LUN(s), the GUI can be used to unload the snapshot or the snapshot can be ejected from the shared removable media drive by the host, similar to how a CD can be ejected.

Another important point to mention is that read/write access is important in this scenario. This is because when an application or even a journaled file system attempts to recover from the (possibly inconsistent) state the new volume presents, these applications need to be able to replay a log or perform other writes to the volume. A system that does not offer read/write access is extremely limited in functionality. In the present invention, writes are stored in a temporary buffer, such that the original PIT image can be loaded again in its original state if desired.

In regard to performance optimization, it is not necessary to perform all of the delta map merges before the volume is presented to the host. Instead, the volume can be presented to the host immediately. Then, as the file system at the host accesses certain blocks, these can be resolved right away. The first time the system accesses a certain block may be slower because of this, but if the system accesses the same blocks again later, the access performance will have improved. While the host is not requesting new blocks, the system automatically continues to resolve the remaining maps. The map merging being performed in this instance relates to merging all the delta maps that are relevant to the selected PIT, to create a single map of all the blocks of the primary volume at that PIT.

Users should be able to browse files and folders and search for files with certain contents, even in the absence of a server. It is nonsensical to recover an entire 200 GB volume just to check if a specific file was already corrupted at a given point in time. The present invention is able to present volumes immediately, as discussed above. So the particular file can be examined and the remainder of the volume does not need to be resolved. But this still requires a server/file system.

The present invention also has the capability of decoding file system information and presenting the user with browsable list of files via FTP or a Web interface. This interface allows users to browse to a specific directory or file and then navigate to the previous/next (or any other) snapshot that was taken of the selected file. Only the necessary blocks will be resolved for this operation, and users are able to navigate through terabytes of data in a minimal amount of time to find the restore volume they are looking for or to just restore the file or directory they are trying to recover.

Automated searches can be performed in a similar fashion, such that the system could automatically find a certain file or content. For example, if a virus struck and corrupted the system, it is difficult to navigate many volumes by time. This is because the virus could have been there already for a long time. Executable files don't change over time, except when a virus strikes, so the system could be queried to find the point in time when the executable changed. Another useful query would be to see a list of different versions of the same file, including size and attributes. From the list, the user can immediately determine the time when the file was updated, for example, during an all-night work session, because it will include the greatest number of changes.

While specific embodiments of the present invention have been shown and described, many modifications and variations could be made by one skilled in the art without departing from the scope of the invention. The above description serves to illustrate and not limit the particular invention in any way.

What is claimed is:

1. A method for data recovery in a continuous data protection system, comprising the steps of:
    selecting a snapshot of a primary volume in the continuous data protection system, the snapshot indicating the data on the primary volume at an earlier point in time which is to be recovered;
    choosing a location on which the snapshot is to be loaded;
    creating a point in time (PIT) map corresponding to the selected snapshot; and
    loading the selected snapshot at the chosen location, thereby making the data which was on the primary volume at a previous point in time accessible at the chosen location.

2. The method according to claim 1, wherein the selecting step includes selecting a scheduled snapshot.

3. The method according to claim 1, wherein the selecting step includes selecting an any point in time (APIT) snapshot.

4. The method according to claim 3, further comprising the step of creating a delta map spanning a time between the time of the selected APIT snapshot and a time of a second delta map, the second delta map immediately preceding the selected APIT snapshot, the delta map being created prior to creating the PIT map.

5. The method according to claim 4, wherein the created delta map includes changes made between the time of the selected APIT snapshot and the time of the second delta map.

6. The method according to claim 4, wherein the creating step includes merging the created delta map with all delta maps earlier than the second delta map.

7. The method according to claim 6, wherein the merging step is optimized by using pre-merged delta maps.

8. The method according to claim 1, wherein the choosing step includes choosing a logical unit on which the snapshot is to be loaded.

9. The method according to claim 1, further comprising the step of:
    accessing the snapshot via a host computer as if the snapshot was the primary volume at an earlier point in time, corresponding to the time of the selected snapshot.

10. The method according to claim 1, further comprising the step of:
    controlling access to the loaded snapshot, wherein only authorized host computers can access the loaded snapshot.

11. A system for data recovery in a continuous data protection system, comprising:
    a host computer;
    a primary data volume; and
    a continuous data protection system, configured to:
        select a snapshot of said primary data volume, said snapshot indicating the data on said primary volume at an earlier point in time which is to be recovered;
        choose a logical unit for loading said selected snapshot;
        load said selected snapshot at the chosen logical unit, thereby making the data which was on said primary volume at a previous point in time accessible at the chosen logical unit; and
        access said selected snapshot on the chosen logical unit via said host computer.

12. The system according to claim 11, wherein said continuous data protection system is configured to select a scheduled snapshot.

13. The system according to claim 11, wherein said continuous data protection system is configured to select an any point in time (APIT) snapshot.

14. The system according to claim 13, wherein said continuous data protection system is further configured to create a delta map spanning a time between the time of said selected APIT snapshot and a time of a second delta map, said second delta map immediately preceding said selected APIT snapshot.

15. The system according to claim 14, wherein said created delta map includes changes made between the time of said selected APIT snapshot and the time of said second delta map.

16. The system according to claim 11, wherein said continuous data protection system is further configured to control access to said selected snapshot.

17. The system according to claim 16, wherein said continuous data protection system is configured to permit only authorized host computers to access said selected snapshot.

18. A computer-readable storage medium containing a set of instructions for a general purpose computer, the set of instructions comprising:
    a selecting code segment for selecting a snapshot of a primary volume in a continuous data protection system, the snapshot indicating data on the primary volume at an earlier point in time which is to be recovered;
    a choosing code segment for choosing a location on which the snapshot is to be loaded;
    a creating code segment for creating a point in time (PIT) map corresponding to the selected snapshot; and
    a loading code segment for loading the selected snapshot at the selected location, thereby making the data which was on the primary volume at a previous point in time accessible at the chosen location.

19. The storage medium according to claim 18, wherein the set of instructions further comprises:

a second creating code segment for creating a delta map spanning a time between the time of a selected any point in time (APIT) snapshot and a time of a second delta map, the second delta map immediately preceding the selected APIT snapshot.

20. The storage medium according to claim 18, wherein the set of instructions further comprises:

a controlling code segment for controlling access to the loaded snapshot, wherein only authorized host computers can access the loaded snapshot.

* * * * *

UNITED STATES PATENT AND TRADEMARK OFFICE
CERTIFICATE OF CORRECTION

PATENT NO. : 7,325,159 B2
APPLICATION NO. : 10/772017
DATED : January 29, 2008
INVENTOR(S) : Stager et al.

It is certified that error appears in the above-identified patent and that said Letters Patent is hereby corrected as shown below:

ON THE TITLE PAGE

At item (56), U.S. PATENT DOCUMENTS, page 2, left column, after the line which begins with "6,163,856", delete "6,163,858  A   12/2000 Dion et al.".

At item (56), OTHER PUBLICATIONS, page 3, right column, line 14, before the word "Kevin", delete "Korniega" and insert therefor --Komiega--.

Signed and Sealed this

Fifteenth Day of July, 2008

JON W. DUDAS
*Director of the United States Patent and Trademark Office*